US005653330A

United States Patent [19]

Muenker

[11] Patent Number: 5,653,330

[45] Date of Patent: Aug. 5, 1997

[54] LOADING MACHINE, PARTICULARLY FOR SHEET-DRYING INSTALLATIONS

[75] Inventor: Juergen Ferdinand Franz Muenker, Wuerzburg, Germany

[73] Assignee: Billhoefer Maschinenfabrik GmbH, Nuernberg, Germany

[21] Appl. No.: 602,647

[22] Filed: Feb. 16, 1996

[30] Foreign Application Priority Data

Feb. 22, 1995 [DE] Germany ........................ 195 06 105.5

[51] Int. Cl.$^{6}$ ........................ B65G 49/05

[52] U.S. Cl. ........................ 198/803.13

[58] Field of Search ........................ 198/803.13

[56] References Cited

U.S. PATENT DOCUMENTS 2,186,566 1/1940 Albright ........................ 198/803.133
2,281,938 5/1942 Klaucke ........................ 198/803.13
3,276,569 10/1966 Seedprf ........................ 198/803.13
3,370,690 2/1968 Seedorf ........................ 198/803.13 X

FOREIGN PATENT DOCUMENTS 472210 3/1992 Japan ........................ 198/803.13 X
0694971 7/1953 United Kingdom ........................ 198/803.13
2224991 5/1990 United Kingdom ........................ 198/803.13

*Primary Examiner*—James R. Bidwell
*Attorney, Agent, or Firm*—Jordan and Hamburg

[57] ABSTRACT

A loading machine, particularly for drying installations for coated sheets or sheet metal plates, with circulating chain conveyors with two roller chains, which are at a distance from one another and the links of which in each case are connected by bars, which bridge the distance between roller chains, stand up at an angle to the chains and which in the inlet region form chambers, which open up in wedge-shaped fashion from deflection gears at the ends for inserting sheets or sheet metal plates essentially horizontally, the roller chains, leaving the deflection gears, being guided on a convex and particularly on a parabolic path.

12 Claims, 4 Drawing Sheets

LOADING MACHINE, PARTICULARLY FOR SHEET-DRYING INSTALLATIONS

BACKGROUND OF THE INVENTION

The invention relates to a loading machine, particularly for drying installations for coated sheets or sheet metal phtes, with circulating chain conveyors with two roller chains, which are at a distance from one another and the links of which in each case are connected by bars, which bridge the distance between roller chains, stand up at an angle to the chains and which in the inlet region form chambers, which open up in wedge-shaped fashion from deflection gears at the ends for inserting sheets or sheet metal plates essentially horizontally.

Such loading machines, with the help of which the coated sheets or sheet metal plates, which arrive consecutively on horizontal conveyors, can be inserted individually into the chambers between in each case two bars, so that they can be dried in a drying or stoving installation without damage to the coated surface, have previously been constructed basically so that, behind the deflection gears, the roller chains rise at an angle on a straight path, pass around further deflection rollers and go over into the horizontal path within the drying installation. As a result, immediately after the roller chains leave the deflection gears, the bars, which initially fan out in wedge fashion in the deflection region, reach the intended position, in which they are inclined rehfive to the roller chains. In this position, all bars run parallel to one another. Consequently, the bars are swiveled in a short transition section from their open position, in which they are inclined to one another, into this parallel position. As a result, the bars come to oscillate and the sheets or sheet metal plates, lying on such bars, frequenfiy are flung away and come into contact with the preceding bar, which can lead to damage to the coated surface.

SUMMARY OF THE INVENTION

It is therefore an object of the invention to design a loading machine of this type in such a manner that damage to the surfaces of the coated sheets or sheet metal plates is avoided reliably even at high conveying speeds.

Pursuant to the invention, this objective is accomplished owing to the fact that the roller chains, leaving the deflection gears, are guided on a convex and particularly on a parabolic path.

Due to this inventive, parabolic inlet curve of the roller chains from the deflection rollers at the inlet to the horizontal conveying section in the drying installation, the wedge angles between the bars gradually close to a final parallel position. Therefore, relative to a single bar, which is swiveled upward appreciably more slowly, no oscillations occur and there is also no flinging away of any sheet or sheet metal plate lying on the bar at the preceding bar.

Moreover, in a further development of the invention, provisions can be made that the roller chains, guided horizontally in the drying installation in a known manner by means of outer rollers, which are spaced apart and run on U-shaped rails, are guided between the inlet and the horizontal section by means of rollers in each chain link on steel frames provided with bent upper edges. Due to this individual guidance of each chain link on its own roller, the desired parabolic inlet curve can be achieved far more accurately than in the case, in which only the normal guidance by means of outer rollers, which are spaced apart by several chain links, is provided.

Further advantages, distinguishing haires and details of the invention arise out of the following description of an example, as well as from the accompanying drawings.

DESCRIPTION OF THE PREFERRED EMBODIMENTS

Figure 1:
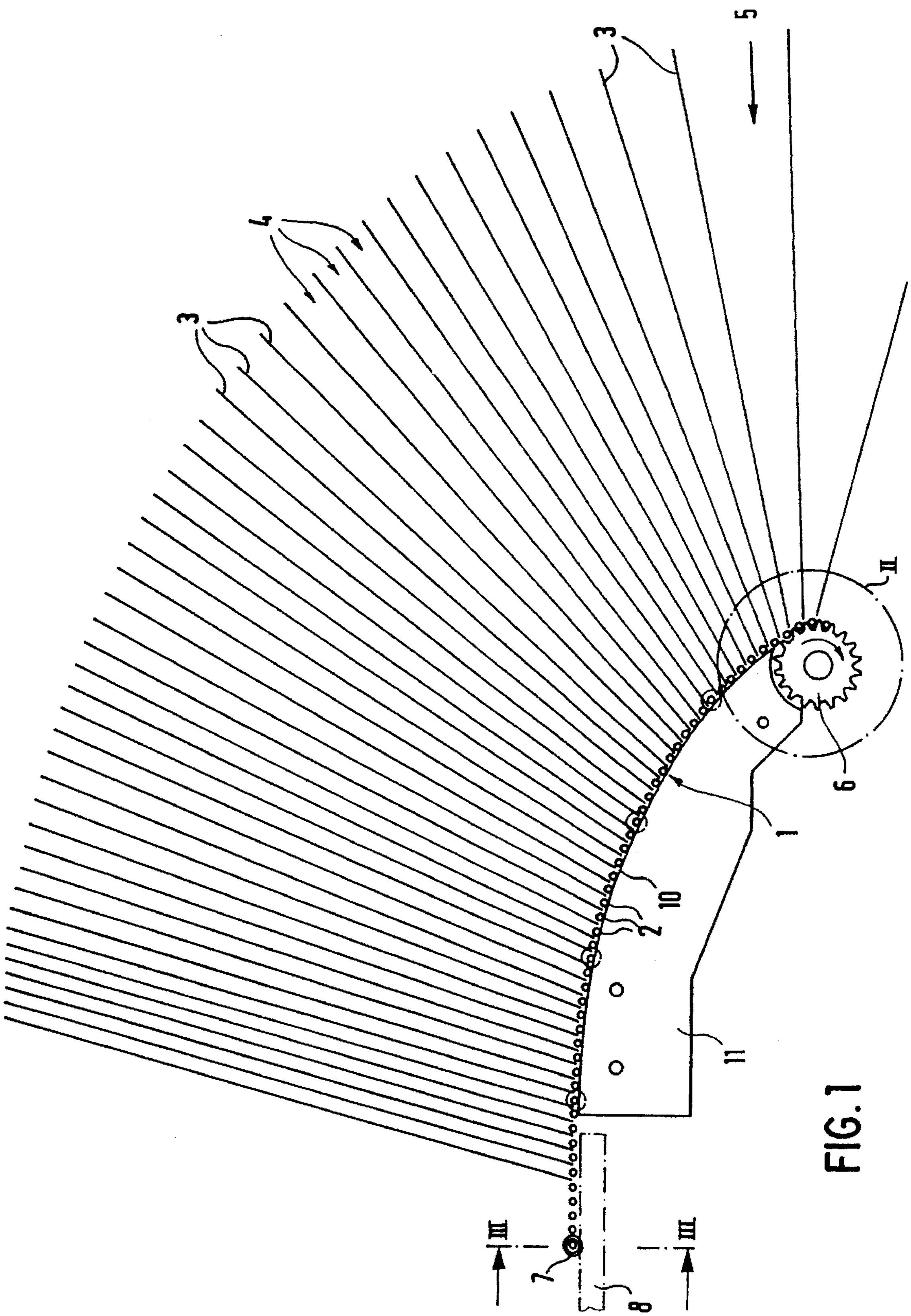
FIG. 1 shows a diagrammatic side view of an inventive loading machine, in which, for the sake of simplicity, only ,the wansporting section of interest for sheets and sheet metal plates is shown and not the lower section, in which the empty bars from the removing end of the installation are returned.
Figure 2:
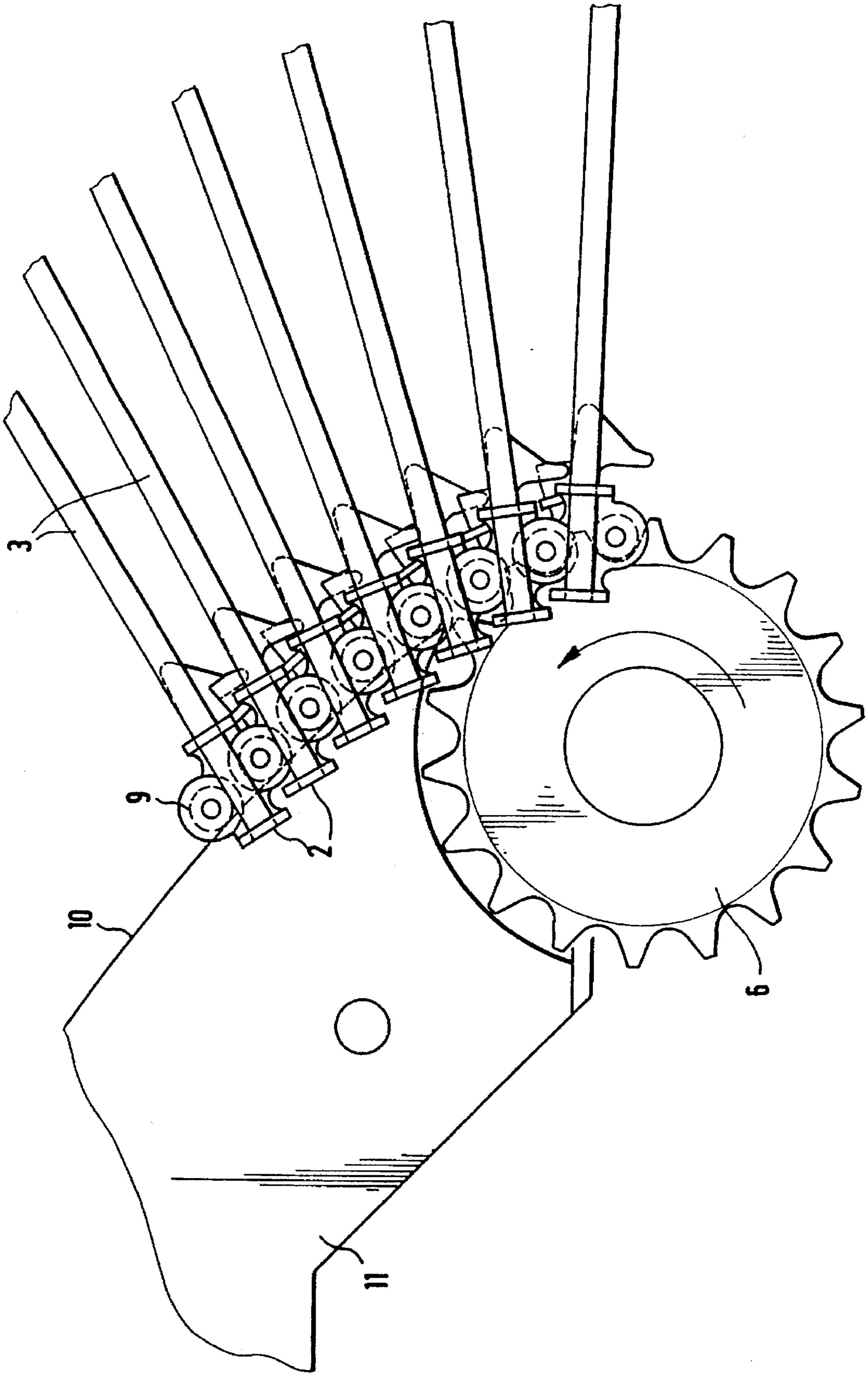
FIG. 2 shows an enlarged side view of the region II of FIG. 1.
Figure 3:
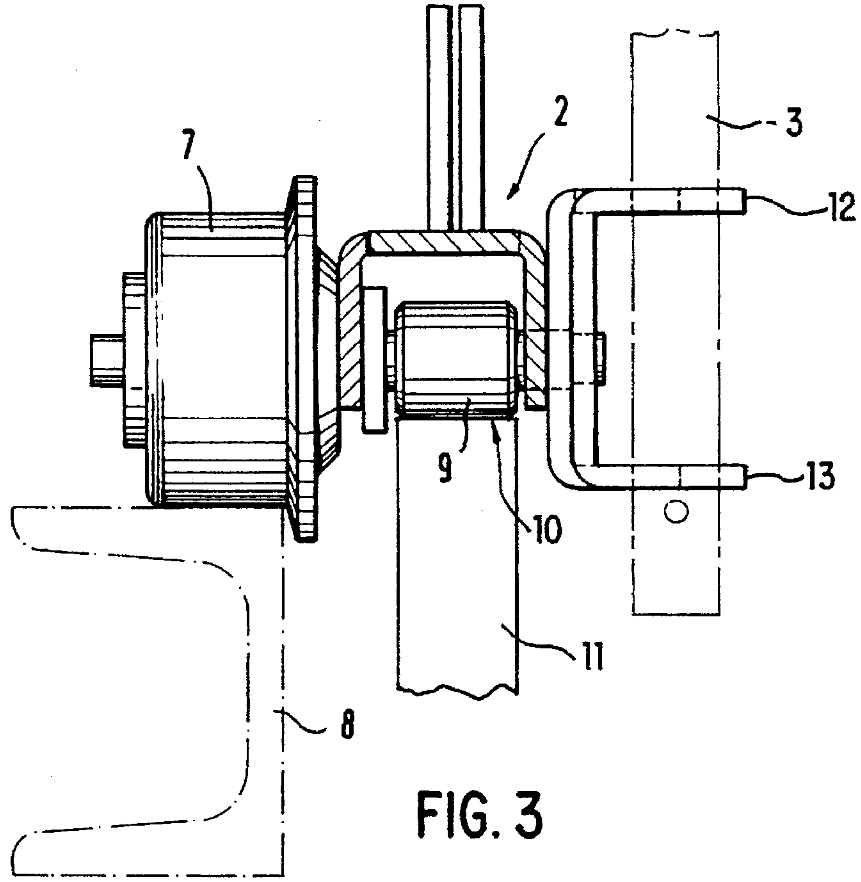
FIG. 3 shows an enlarged section along the line III—III of FIG. 1.

The loading machine, shown in FIG. 1, shows the inlet section of a circulating chin conveyor with two conveying chains, which are spaced apart and of which only conveying chain 1 can he recognized, while the other must be imagined to lie behind it at a distance in a plane parallel to that of FIG. 1. The conveying chains 1 are cormeeted to one another by bars 3, which in each case connect two opposite individual chain links 2 and between one another form chambers 4 for accommodating in each case a single coated sheet or a coated sheet metal plate, which is to be transported into a drying installation adjoining the loading machine on the left hand side of FIG. 1, so that the coating, which is still soft or mist, can be cured before the sheets or sheet metal plates with the finished surface coating are removed at the other end of the drying installation and the circulating chain conveyor, with bars hanging downward, is brought back to the region of the loading machine shown on the right hand side of FIG 1. The coated sheets or sheet metal plates, which are not shown in the drawings, are inserted preferably by a horizontal conveyor in the direction of arrow 5 in FIG. 1 into the bars 3 fanned out in wedge-shaped fashion by deflection gears 6 at the ends of the ban 3 in the inlet region and are then transported with the edge upright on the revolving chains and otherwise lying on the inclined bars.

In the horizontal section within the drying installation, that is, in the region of section III—III and going on from there to the left in FIG. 1, the roller chains are guided by means of outer rollers 7 spaced apart on U-shaped profiled rails 8 in each ease about several individual chain links 2. In the region of the loading machine, direcfiy from the outer from the deflection gear 6, (the roller chains), with the help of rollers 9 assigned in each case to each individual chain link 2, run on the convexly curved upper edge 10 of steel frames 11, the upper edge 10 preferably being curved parabolically. As a result, after the sheets or sheet metal plates are inserted, the bars 3, as they leave the deflection rollers, do not suddenly reach the parallel position, which they occupy at the outlet of the loading machine as well as during the further transport through the drying installation, but rather are swiveled gradually into the end position with closing of the wedge angle between one another, so that the sudden folding up with the danger that the sheet or sheet metal phte will collide with the preceding bar is prevented reliably.

Figure 4:
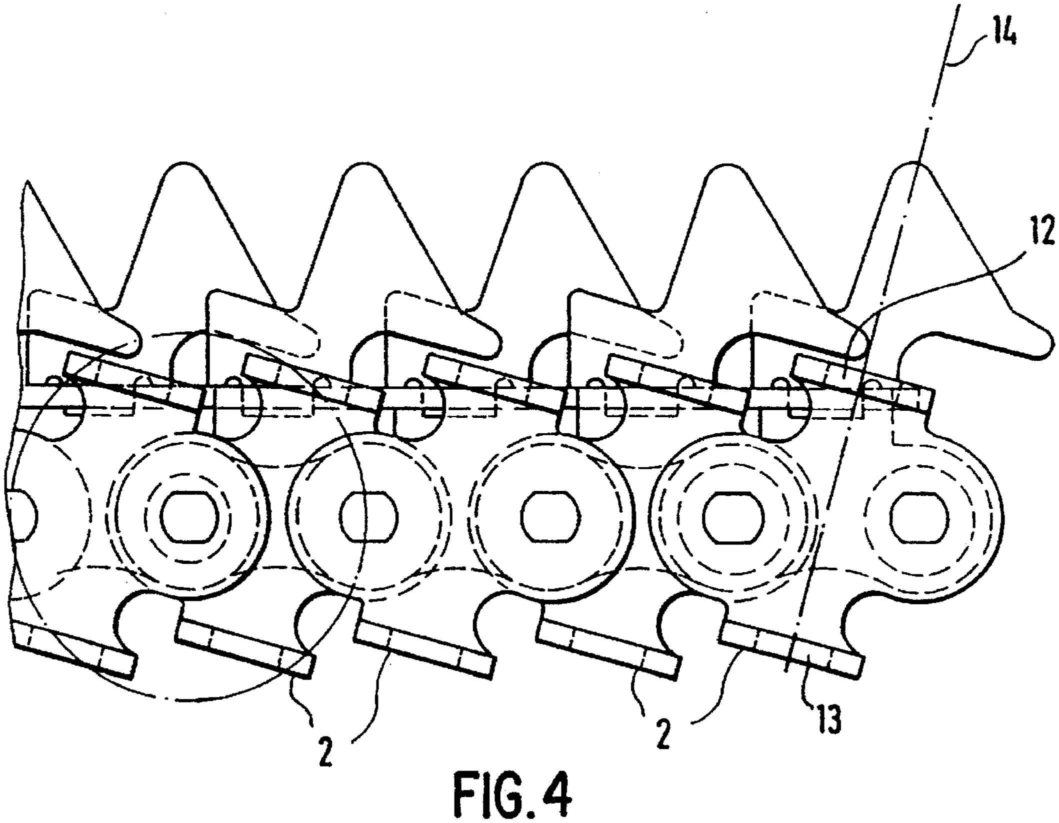
FIG. 4 shows an enlarged side view of a roller chain without the inserted transporting bars.

FIG. 4 shows how the final inclined position of the bars at an angle of about 75° to the horizontal sections of the roller chains is brought about by insertion recesses 12 and 13 in each individual chain link 2. The therefrom resulting position of the bars is indicated by the dash-and-dot line 14.

Figure 5:
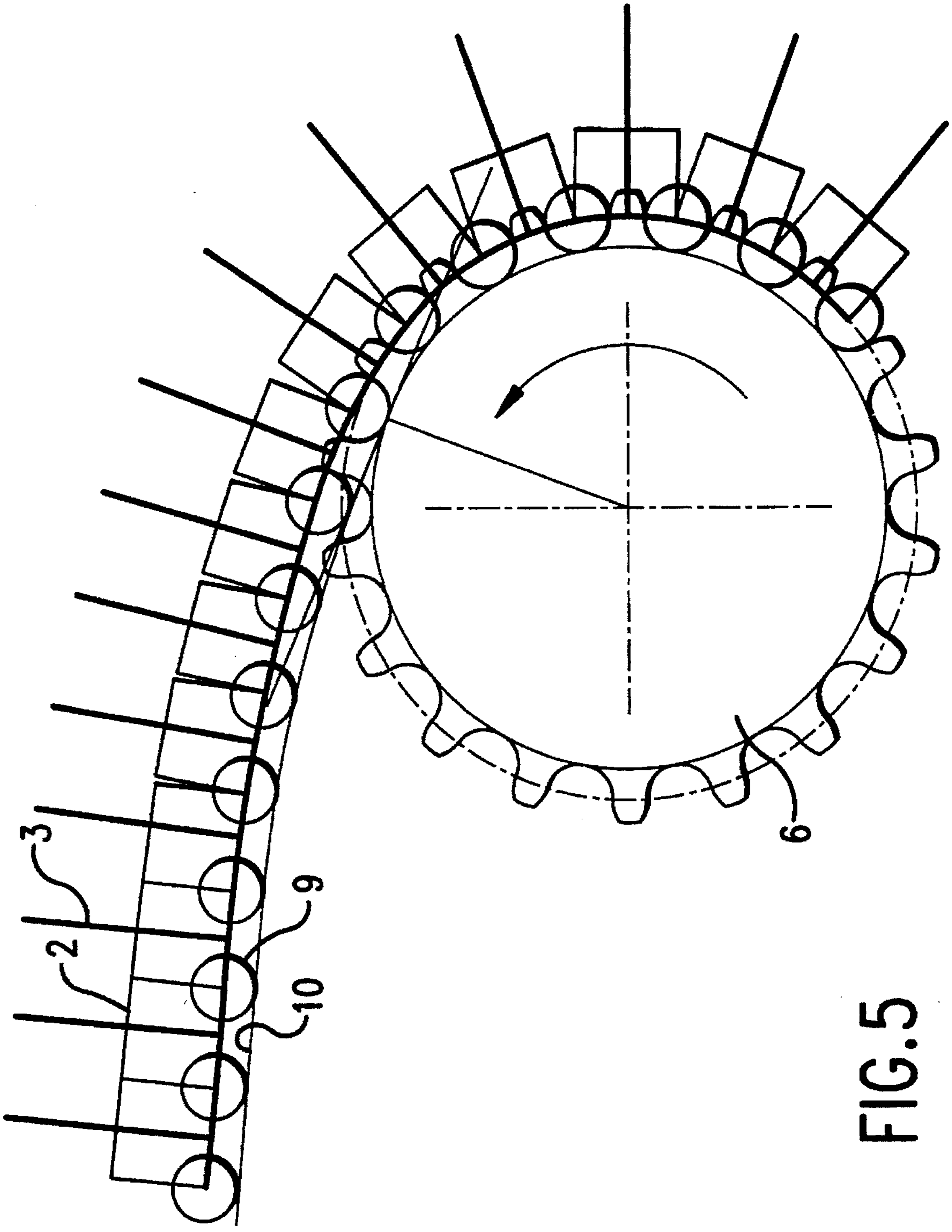
FIG. 5 shows a further enlarged schematic view of the region II of FIG. 1.

In the schematic diagram of FIG. 5, the stop position between the individual chain links 2 is shown schematically by the rectangular tops, that is, it can be seen how the bars 3 are opened in the region of the horizontal insertion plane, while the bars 3 then are essentially parallel to one another due to the engagement of corresponding parts of the chain links 2 in the upper horizontal transporting region.

What I claim is:

1. Apparatus for loading and conveying sheets comprising two roller chains spaced from one another, each of said roller chains having links connected by bars, said bars extending between said two roller chains, deflection gear means about which said roller chains pass, said deflection gear means being operable to dispose said bars in a spaced wedge-shaped disposition in which spaced juxtaposed bars converge as said deflection gear means is approached, the space between said bars in a wedge-shaped disposition defining a receiving area for receiving said sheets which are fed substantially horizontally to said receiving area, and roller chain guide means being disposed downstream of said deflection gear means and being operable to guide said two roller chains over a non-circular and non-linear path of travel and to progressively change said bars from said wedge-shaped disposition to a substantially parallel disposition as said two roller chains are guided by said roller chain guide means.

2. Apparatus according to claim 1 wherein said non-circular and non-linear path of travel is a parabolic path.

3. Apparatus according to claim 1 further comprising horizontal guide rails downstream of said roller chain guide means, and spaced guide rail rollers on said roller chains which are guided on said horizontal guide rails.

4. Apparatus according to claim 3 wherein said roller chain guide means extends from said deflection gear means to said horizontal guide rails, each of said links in said roller chains having a link roller guided on said roller chain guide means.

5. Apparatus according to claim 3 wherein said horizontal guide rails have a U-shaped configuration.

6. Apparatus according to claim 3 wherein said roller chain guide means comprises a structure having a non-circular and non-linear upper edge, said non-circular and non-linear upper edge defining said non-circular and non-linear path of travel, said link rollers engaging said non-circular and non-linear upper edge.

7. Apparatus according to claim 3 wherein said roller chain guide means include a non-circular and non-linearguide surface which defines said non-circular and non-linear path of travel, said link rollers engaging said non-circular and non-linear guide surface to effect said progressive change in disposition of said bars from said wedge-shaped disposition to said parallel disposition in which said bars are parallel to one another, said progressive change occurring as said link rollers pass over said non-circular and non-linear guide surface.

8. Apparatus according to claim 3 wherein said deflection gear means comprises a gear wheel having gear teeth engaging said links of said roller chains, said gear wheel carrying said roller chains about a circular path, said roller chain guide means being juxtaposed to said gear wheel such that said roller chains change from a circular path of travel to said non-circular and non-linear path of travel in passing from said gear wheel to said roller chain guide means.

9. Apparatus according to claim 8 wherein said roller chain guide means has an end guide surface portion onto which said roller chains pass when said roller chains leave said gear wheel, said end guide surface potion being juxtaposed to and substantially langential to said gear wheel.

10. Apparatus according to claim 6 wherein said non-circular and non-linear path of travel is a parabolic path.

11. Apparatus according to claim 7 wherein said non-circular and non-linear path of travel is a parabolic path.

12. Apparatus according to claim 8 wherein said non-circular and non-linear of travel is a parabolic path.

* * * * *